United States Patent
Grimlund et al.

(10) Patent No.: US 8,319,607 B2
(45) Date of Patent: Nov. 27, 2012

(54) INVENTORY MONITORING SYSTEM

(75) Inventors: Peter Grimlund, Plymouth, MN (US);
Harley Feldman, Shorewood, MN (US);
Ken Drewlo, Maple Grove, MN (US);
Nicholas Singh, Apple Valley, MN (US)

(73) Assignee: Seeonic, Inc., Plymouth, MN (US)

( * ) Notice: Subject to any disclaimer, the term of this patent is extended or adjusted under 35 U.S.C. 154(b) by 305 days.

(21) Appl. No.: 12/202,207

(22) Filed: Aug. 29, 2008

(65) Prior Publication Data
US 2009/0146800 A1 Jun. 11, 2009

Related U.S. Application Data

(60) Provisional application No. 60/968,798, filed on Aug. 29, 2007.

(51) Int. Cl.
*H04Q 9/00* (2006.01)
*G08C 19/00* (2006.01)

(52) U.S. Cl. ....... 340/5.92; 340/505; 235/385; 700/236; 705/22; 705/28; 705/29

(58) Field of Classification Search .............. 340/5.92, 340/505; 235/385; 700/236; 705/22, 28–29
See application file for complete search history.

(56) References Cited

U.S. PATENT DOCUMENTS

| | | | |
|---|---|---|---|
| 4,636,950 A * | 1/1987 | Caswell et al. ................ 705/28 |
| 5,565,858 A * | 10/1996 | Guthrie ...................... 340/10.33 |
| 5,920,261 A | 7/1999 | Hughes et al. |
| 6,563,417 B1 * | 5/2003 | Shaw ............................ 340/10.1 |
| 7,152,040 B1 | 12/2006 | Hawthorne et al. |
| 7,654,456 B2 * | 2/2010 | Roewer ........................ 235/385 |
| 2002/0087436 A1 | 7/2002 | Guthrie et al. |
| 2003/0115096 A1 | 6/2003 | Reynolds et al. |
| 2005/0060246 A1 * | 3/2005 | Lastinger et al. .............. 705/28 |
| 2005/0088299 A1 * | 4/2005 | Bandy et al. ............. 340/539.16 |
| 2005/0253704 A1 * | 11/2005 | Neuwirth ................ 340/539.13 |
| 2006/0022815 A1 | 2/2006 | Fischer et al. |
| 2006/0232412 A1 * | 10/2006 | Tabacman et al. .......... 340/572.1 |
| 2006/0267733 A1 * | 11/2006 | Steinke et al. .............. 340/10.1 |
| 2006/0284727 A1 * | 12/2006 | Steinke ...................... 340/10.31 |
| 2007/0018820 A1 * | 1/2007 | Chand et al. .............. 340/572.1 |
| 2007/0024436 A1 | 2/2007 | Bandy |
| 2007/0035380 A1 | 2/2007 | Overhultz et al. |
| 2007/0145130 A1 * | 6/2007 | Danilewitz ................... 235/385 |
| 2007/0236336 A1 * | 10/2007 | Borcherding ............. 340/10.34 |
| 2007/0267473 A1 * | 11/2007 | Thayer ......................... 235/375 |
| 2008/0068173 A1 | 3/2008 | Alexis et al. |
| 2008/0079577 A1 * | 4/2008 | Malik ........................ 340/572.1 |
| 2008/0129509 A1 * | 6/2008 | Duron ........................ 340/572.4 |
| 2008/0186174 A1 * | 8/2008 | Alexis et al. .............. 340/572.1 |
| 2008/0314980 A1 * | 12/2008 | Folcke et al. ................. 235/385 |

OTHER PUBLICATIONS

Supplementary European Search Report for Application No. 08828568.9 mailed on Jun. 8, 2012, 7 pages.
First Office Action for Application No. 200880107331.8 from SIPO, mailed on Jul. 2, 2012, 9 pages.

* cited by examiner

*Primary Examiner* — Jennifer Mehmood
*Assistant Examiner* — Andrew Bee
(74) *Attorney, Agent, or Firm* — Merchant & Gould P.C.

(57) ABSTRACT

An inventory monitoring system including a data collection and transmission module and a data evaluation module. The data collection and transmission module receives data from an RFID tag and transmits the data to the data evaluation module to thereby enable the presence of a product to which the RFID tag is attached.

21 Claims, 5 Drawing Sheets ved in carrying a large amount of inventory value.

INVENTORY MONITORING SYSTEM

This application claims priority to U.S. Provisional Applic. No. 60/968,798, filed Aug. 29, 2007, the contents of which are incorporated herein by reference.

FIELD OF THE INVENTION

The invention relates generally to a product monitoring system. More particularly, the invention relates to an RFID product monitoring system.

BACKGROUND OF THE INVENTION

In certain industries there is a significant value of product in inventory either in the retail store or at other locations in the distribution chain. Accurately tracking the amount and location of inventory helps to not only reduce the amount of inventory but also to prevent the inventory from spoiling.

In many industries retailers rely on point of sale systems to track product sales. Using this data the retailers calculate the inventory by subtracting products sold from the incoming products. A significant limitation of such a system is that it cannot provide data on the number of products that are actually on the store shelves at a particular time, as it is possible for products to be removed from the store shelves for a variety of reasons such as theft.

There are also certain classes of products such as DVDs, CDs and computer games that have significant initial demand when initially released. The ability to accurately stock these products plays an important role in maximizing the revenue potential before the interest in such products wanes. At such time, the inventory level should be reduced and the retailer may consider offering promotions such as price discounts to enhance the sales of such products.

As a result, the actual inventory is periodically determined by manual counting of the product on the store shelves. While such a process can be quite time consuming and, as such, expensive, this process enables the retailer to reconcile the difference between the number of products actually on the store shelves with the data provided by the point of sale system. The retailer would thereby be able to ascertain if any products are missing.

Under conventional product distribution models, manufacturers generally ship products to distribution centers that then supply the products to the retail stores. While the distribution centers enable products to be rapidly delivered to the retail stores when needed, operating the distribution centers is a significant expense and results in carrying a large amount of inventory value.

In an attempt to increase the productivity of distribution centers and decrease their inventory, retailers are increasingly having products delivered directly to the retail stores. Since retail stores often have limited space to store excess products on shelves or in storage areas, directly shipping products to retail stores requires more accurate information about the number of products on the store shelves at any given time.

Another area where a large value of inventory may exist is in medical devices that are marketed by sales representatives. These sales representatives are typically based in a location that is not close to the company's office. As such, the sales representative typically maintains an inventory of the products in his/her home or vehicle.

While this approach enables the sales representative to demonstrate the product to potential purchasers and quickly deliver the product when purchased, this approach leads to each sales representative having a relatively large value of products in his/her possession at any given time.

SUMMARY OF THE INVENTION

An embodiment of the invention is directed to an inventory monitoring system that includes a data collection and transmission subsystem and a data evaluation subsystem. The data collection and transmission subsystem includes a microprocessor subsystem, an RFID reader subsystem, an RFID antenna and a communication subsystem.

The RFID reader subsystem is operably connected to the microprocessor subsystem. The RFID antenna is operably connected to the RFID reader subsystem for receiving information from an RFID tag. The communication subsystem is operably connected to the microprocessor subsystem. The communication subsystem is capable of transmitting the RFID tag information to the data evaluation subsystem.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
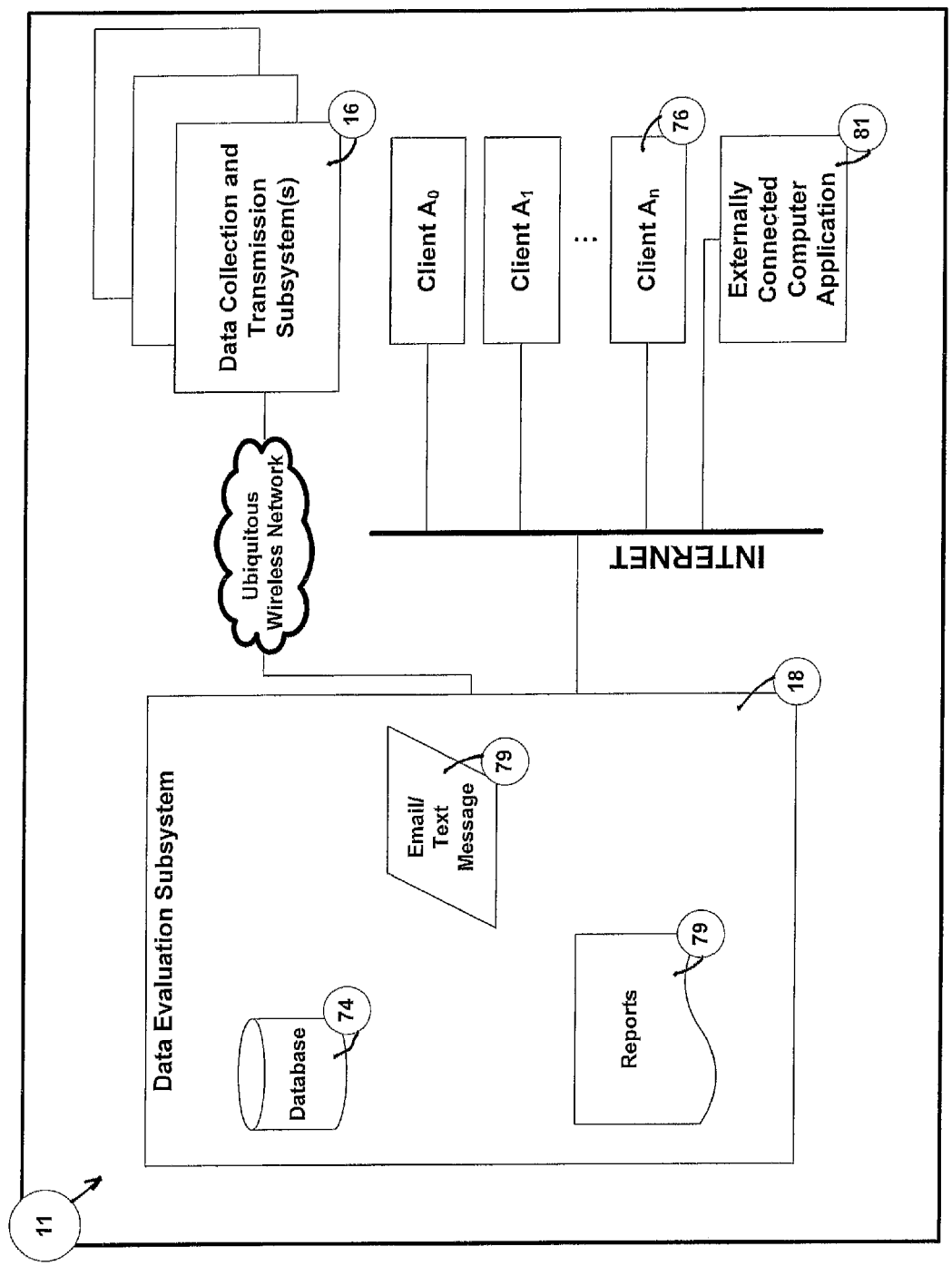
FIG. 1 is a schematic view of an inventory monitoring system according to an embodiment of the invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

An embodiment of the invention is particularly suited for use in monitoring the status of products between leaving the manufacturer or distribution center and recording the sale of the product such as through a point of sale terminal. The inventory monitoring system thereby provides data on what items are actually on display and available for purchase. The invention also eliminates manual counting of products when performing cycle counts.

Additionally, the inventory monitoring system of the invention enables more accurate decisions to be made about product replenishment to reduce out-of-stocks and overstocks. The invention also eliminates prior practices of using estimates or forecasts to track product replenishment. The system further improves promotion execution, improves product launch execution and enhances labor efficiency.

While the inventory monitoring system is amenable for installation and use by retailers, the concepts of the inventory monitoring system are particularly suited for use by entities other than the retailer that play roles in the manufacture and distribution of products such as manufacturers.

The inventory monitoring system collects data about the products and then transmits the data so that the data can be analyzed to determine when the products need to be restocked. The inventory monitoring system 10 may generally include three components: (1) product tags 12 that are attached to a product 14, (2) a data collection and transmission subsystem 16, and (3) a data evaluation subsystem 18.

The product tags 12 are typically RFID tags that may be put onto the product 14 or product package during the manufacturing process. Alternatively, the product tags 12 may be placed on the product 14 during the distribution process. A person of skill in the art will appreciate that the concepts of the invention may be adapted for use with other types of objects that facilitate communication with the data collection and transmission subsystem 16.

The data collection and transmission subsystem 16 may be configured to be self-contained such that the data collection and transmission subsystem 16 may be operated without attachment to external resources such as power or data transfer networks. This configuration thereby enables the data collection and transmission subsystem 16 to be placed at any location in the retail store.

Configuring the communication system in this manner obviates the need for the invention to be compatible with the power, telephone or computer network at the location at which the data collection and transmission subsystem 16 is located. Using this communication system also eliminates potential security risks associated with attaching to the retailer's power, telephone or computer network.

To facilitate placing the data collection and transmission subsystem 16 in a variety of locations, the data collection and transmission subsystem 16 may have a relatively small size. In one application, the data collection and transmission subsystem 16 has a size of about 5 inches wide, 8 inches long and 2 inches high.

A cover may be provided on the data collection and transmission subsystem 16 that not only protects the components of the data collection and transmission subsystem 16 from breakage but also restricts access to components inside of the data collection and transmission subsystem 16.

Figure 2:
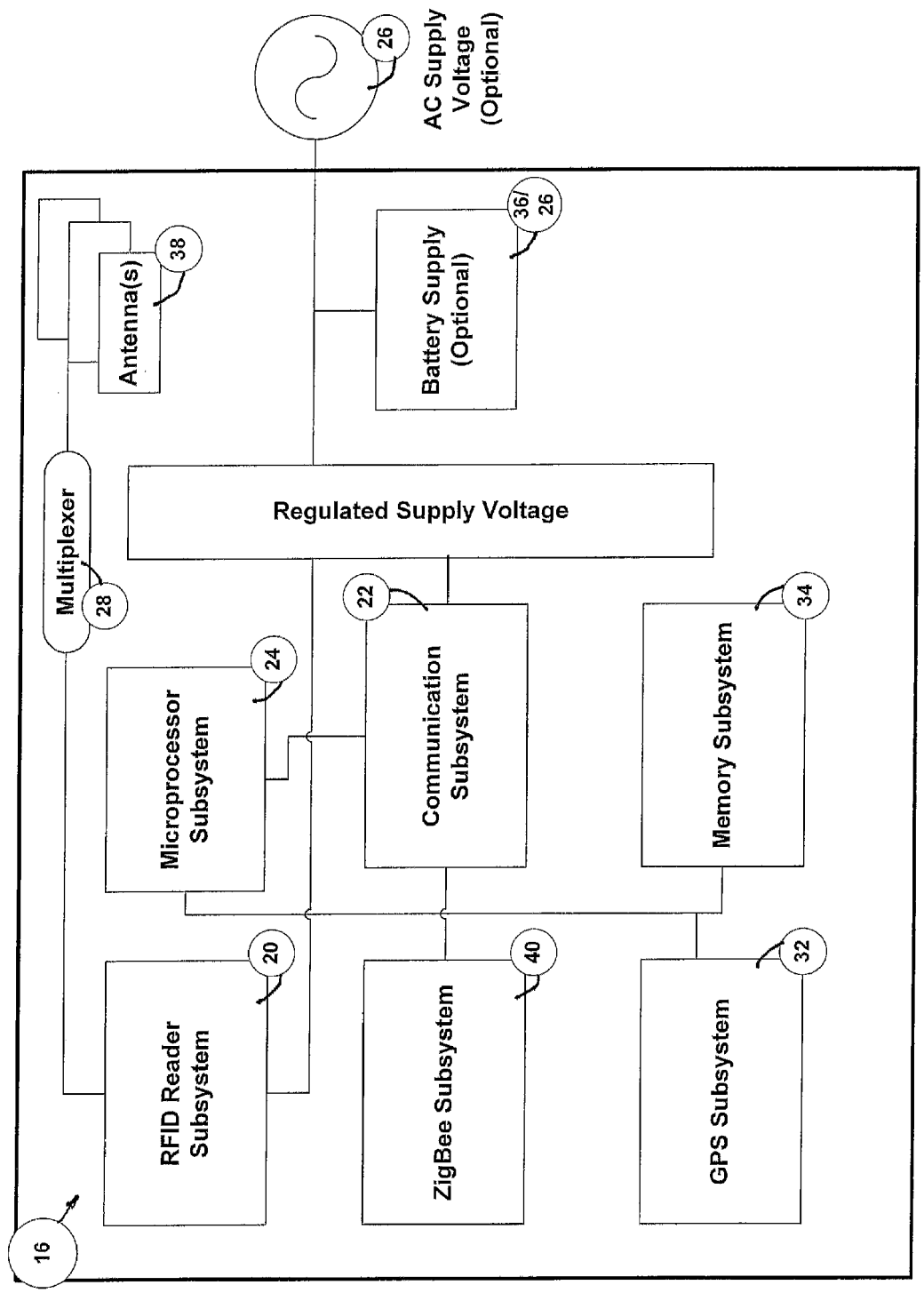
FIG. 2 is a schematic view of a data collection and transmission subsystem for use in conjunction with the inventory monitoring system.

The data collection and transmission subsystem 16 may include an RFID reader subsystem 20, a communication subsystem 22, a microprocessor subsystem 24 and a power source 26, as illustrated in FIG. 2. The data collection and transmission subsystem 16 may further include an antenna multiplexer 28, which enables the data collection and transmission subsystem 16 to be used with multiple antennas.

The RFID reader subsystem 20 may be selected based upon a variety of factors such as desired frequency. One suitable RFID reader subsystem 20 is available from ThingMagic Inc. under the designation M5e. Such an RFID subsystem enables determining the port from which the data is being obtained to more accurately track the location of the products that are being monitored with the data collection and transmission subsystem 16. In certain embodiments, it is possible to removably mount the RFID reader subsystem 20 in the data collection and transmission subsystem 16 to facilitate removing or replacing the RFID reader subsystem 20.

While it is possible for the communication subsystem 22 to communicate with the data evaluation subsystem 18 using conventional wired telephone, wired computer networks or wireless computer networks, data may be transmitted between the data collection and transmission subsystem 16 and the data evaluation subsystem 18 using a wireless communication system such as a mobile or cellular telephone network.

The communication subsystem 22 may be configured to operate using a variety of communications protocols, examples of which include GSM, GPRS, Wi-Fi and Bluetooth. One such suitable communications subsystem 22 that is suitable for use with conventional mobile wireless communication networks is available from Siemens.

In certain embodiments, it is possible to removably mount the communication subsystem 22 in the data collection and transmission subsystem 16 to facilitate removing or changing of the communication subsystem 22. In certain embodiments, the communication subsystem may include cellular triangulation capabilities.

To enhance the battery life in the data collection and transmission subsystem 16, the communications subsystem 22 may be configured to only initiate calls. Alternatively, the communications subsystem 22 may be configured to also receive calls from the data evaluation subsystem 18.

While it is possible for the communications subsystem 22 to operate in a single direction that transmits data to the data evaluation subsystem 18, using a two-way communications system enables the data evaluation subsystem 18 to issue requests for additional data from the data collection and transmission subsystem 16 such as operational status of the data collection and transmission subsystem 18 and ambient conditions.

To facilitate using the data collection and transmission subsystem 16 in a variety of locations in a number of countries, the data collection and transmission subsystem 16 may include a SIM card holder that is adapted to receive a SIM card such as is conventionally used with mobile phones. Replacing the SIM card may enable the data collection and transmission system 16 to be utilized on other communication networks or in other countries.

To enhance the ability of the communication subsystem 22 to connect with the communication network, a communication antenna 30 may be provided in the data collection and transmission subsystem 16. In certain embodiments, the communication antenna 30 may be integrated with the other components of the communication subsystem 22 while in other embodiments, the communication antenna 30 may be external to the data collection and transmission subsystem 16.

To enable tracking of the location of the data collection and transmission subsystem 16, a GPS subsystem 32 may be included in the data collection and transmission subsystem 16. In certain embodiments, the GPS subsystem 32 may be embedded in the communication subsystem 22.

The microprocessor subsystem 24 may have a relatively basic configuration in view of the relatively limited functionality of the data collection and transmission subsystem 16. Software may be installed on the microprocessor subsystem 24 that provides functionality for accepting data from the RFID reader subsystem 20, cleansing the data read and communicating with the data evaluation subsystem 18. One such microprocessor subsystem 24 is available from Microchip Technology, Inc. While it is possible to utilize a variety of types of microprocessors, in certain embodiments, the microprocessor subsystem 24 may include power regulation capabilities to enhance the battery life.

The microprocessor subsystem 24 or other components of the data collection and transmission subsystem 16 may include a real time clock that facilitates incorporating time stamping on events of the data collection and transmission subsystem 16 as well as data collected by the data collection and transmission subsystem 16.

The components of the data collection and transmission subsystem 16 may all be mounted on a printed circuit board. The power source 26 may be AC or DC and may operate at a variety of voltages. An advantage of using DC is that the data collection and transmission subsystem 16 may operate off of a battery 36 connected thereto and thereby not need to be attached to an external power source.

Depending on the number of product tags that are intended to be scanned with the data collection and transmission subsystem 16, a memory subsystem 34 may be provided in the data collection and transmission subsystem 16. The memory subsystem 34 may be selected with a size and type depending on the number of product tags that are to be scanned and the frequency at which the product data is to be transmitted to the data evaluation subsystem 18. In certain embodiments, the memory subsystem 34 contains non-volatile memory such as an EPROM and has the capacity to store product data from at least 5,000 product tags.

The battery 36 may take a variety of forms. One suitable configuration for the battery 36 is a 12 volt lead acid battery. It is possible to configure the battery so that it is disposed after being depleted or may be recharged after being depleted.

To facilitate replacing the battery 30, the battery 36 may be mounted external to the data collection and transmission subsystem 16. In certain embodiments, a modular connector may be used to removably attach the battery 36 to the data collection and transmission subsystem 16. The modular connector may include a locking mechanism that prevents inadvertent disconnection of the battery 36 from the data transmission and collection subsystem 16.

An important feature of extending the battery life of the data collection and transmission subsystem 16 is to control when the components in the data collection and transmission subsystem 16 are on. By default the components in the data collection and transmission subsystem 16 are off.

In between scanning the product tags and transmitting the product data to the data evaluation unit 18, the data collection and transmission unit 16 should be in a very low power consumption sleep mode. Configuring the data collection and transmission subsystem 16 in this manner may enable the data collection and transmission subsystem 16 to operate for more than a month on a single battery.

An RFID antenna 38 such as a HF or UHF antenna may be connected to the multiplexer 28 or to the RFID reader 20 directly that can accept HF or UHF signals from the RFID tags. The multiplexer 28 enables multiple RFID antennas 38 to be connected to the data collection and transmission subsystem 16. In one configuration, the multiplexer 28 enables connection of 4 RFID antennas 38. If a second set of 4 multiplexers 28 is connected after the multiplexer 28, it would be possible to connect 16 RFID antennas 38 to the data collection and transmission subsystem 16.

A person skilled in the art will appreciate that it is possible to utilize additional layers of multiplexers 28 to attach more RFID antennas 28 to the data collection and transmission subsystem 16. It is also possible to utilize alternate multiplexers that provide more or less than 4 RFID connection ports. One aspect to note is that a limitation on the number of RFID antennas that may be connected to the data collection and transmission subsystem 16 may be limited by the signal quality and the sensitivity of the components. It may be possible to include an amplifier (not shown) in the data collection and transmission subsystem 16 to enhance the signal quality.

To increase the performance of the data collection and transmission subsystem 16, the connectors used to attach the antennas may exhibit a low insertion loss. While it is possible to permanently attach the RFID antennas 38 to the data collection and transmission subsystem 16, the connectors may enable removable attachment of the RFID antennas 38. Examples of low loss connectors that permit removable attachment of the RFID antennas 38 are U-FL and MMCX.

The data collection and transmission subsystem 16 may also include a ZIGBEE communication subsystem 40 to facilitate wireless communication with components of the inventory monitoring system 10. One such suitable ZIGBEE communication subsystem 40 is available from Microchip Technology Inc.

As an alternative to or in addition to using a ZIGBEE communication subsystem 40, the data collection and transmission subsystem 16 may include Wi-Fi or Bluetooth capabilities. A criteria for selecting the communication protocol is that it provide reliable transfer of the product data.

The ZIGBEE communication subsystem 40 enables the data collection and transmission subsystems 16 to be configured as either master units or slave units. The master units may have a configuration similar to the configuration of the data collection and transmission subsystem 16 that is discussed above. The slave units may be formed with a lower cost configuration such as not including a cellular communication subsystem.

Figure 4:
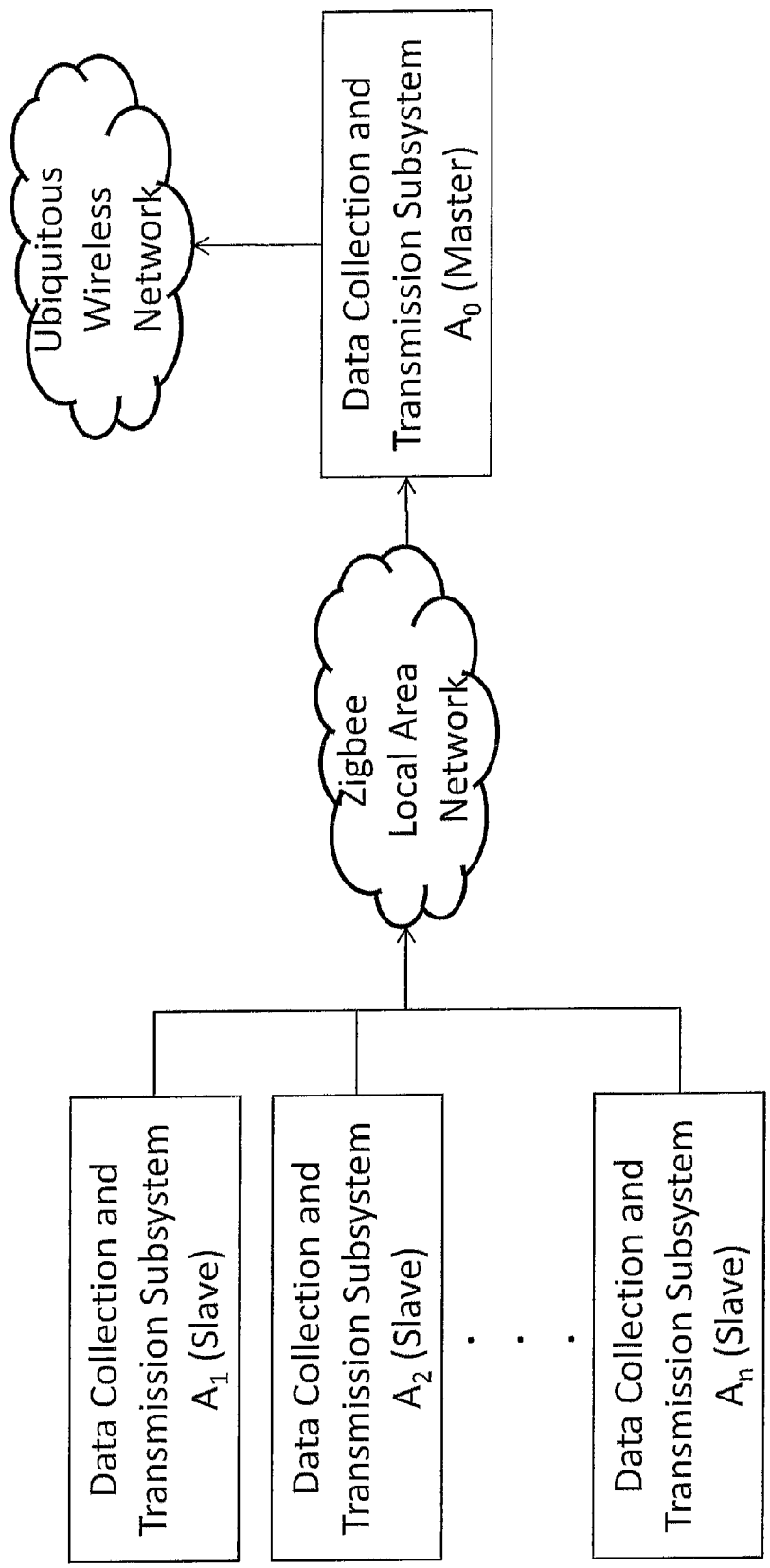
FIG. 4 is a schematic illustration of another embodiment of the inventory monitoring system.

In this configuration, each of the slave units communicates with the master unit to transfer data regarding the product tags, as illustrated in FIG. 4. The master unit then transmits the product tag data to the data evaluation subsystem 18.

The data collection and transmission subsystem 16 may include limited controls and displays on the surface thereof. One such control may be a power button. Alternatively, the data collection and transmission subsystem 16 may be turned on by connecting to the battery 36. The data collection and transmission subsystem 16 may be configured to initiate a call to the data evaluation subsystem 18 when the data collection and transmission subsystem 16 is first powered on.

This process will enable the data evaluation unit 18 to confirm that the data collection and transmission subsystem 16 is being used in an authorized manner. The process can also enable the data evaluation subsystem 18 to update the configuration of the data collection and transmission subsystem 16 for the intended application.

Examples of displays that may be provided on the data collection and transmission subsystem 16 include a power indicator, a transmit indicator, a scanning indicator, a sleep mode indicator, and a communications signal strength indicator. It is possible for the displays to take a variety of forms, examples of which include LEDs.

The data collection and transmission subsystem 16 may be configured to periodically transmit data to the data evaluation system 18. The periodicity of data transmission from the data collection and transmission subsystem 16 may be set in the data evaluation subsystem 18. The periodicity may be adjusted to the desired granularity of collecting the inventory from the data collection and transmission subsystem 16, which affects the battery life because the more often the product data is collected and transmitted the shorter the battery life.

In addition to a unique product identification number, the data received from the RFID product tags 12 may include additional information, examples of which include a manufacturer identification, a product number, and a lot number. The product tag data may be associated with additional data, examples of which include the time the data was acquired, the antenna that received the data, and the location of the shelf. This information is collectively identified as product data. The product data is stored in memory in the data collection and transmission subsystem 16 until it is desired to transmit the product data to the data evaluation subsystem 18.

In addition to tracking the presence of products on store shelves, it is also possible to use the inventory monitoring system 10 to use RFID tags on additional items such as on the store shelves and other objects that are placed in the store. In addition, product identification tags can be attached to antennas 38.

In certain embodiments, it may be important to ensure that every one of the product tags is read before transmitting each batch of product data. In these situations, the data collection and transmission subsystem 16 may scan the product tags multiple times. For example, the scan may be performed five or more times. Additionally or alternatively, the scan may be repeated until no new tags are scanned. This process may be identified as smoothing the data.

It may be appreciated that it is also possible to have the data collection and transmission subsystem 16 conduct a single scan of the product tags and then rely on the data evaluation subsystem 18 to compare the readings between batches of product data that are received from the data collection and transmission subsystem 16.

One advantage of this approach is that it enables the computing power to be moved from the data collection and transmission subsystem 16 to the data evaluation subsystem 18. This process may also enable the size of the memory subsystem 34 to be reduced.

The microprocessor subsystem 24 may process the product data before transmitting the product data to the data evaluation subsystem 18. Examples of this processing may include compressing the product data and encrypting the product data.

Additionally, the product data may be transmitted in its entirety or the product data may be scrubbed so that only unique product data is transmitting by removing multiple entries from particular product tags 12.

Next, the product data may be combined with other information from the data collection and transmission subsystem 16 that is indicative of the operation of the data collection and transmission subsystem 16. Examples of subsystem data include battery voltage, communications network signal strength, ambient temperature, ambient humidity, GPS location data, number of prior failed attempts to transmit data, and validation information such as a checksum to determine if there are transmission errors. In certain embodiments, the subsystem data includes an inertial sensor to monitor forces that are placed on the data collection and transmission subsystem 16.

Even when data associated with a relatively large number of product tags is transmitted in a single session, the size of the data is relatively small. As such, having a high speed connection to transfer the data is not required.

The subsystem data may also include data that identifies the antennas that are connected to the data collection and transmission subsystem 16. Associating the data collection and transmission subsystem 16 with a particular code reduces the potential of the data collection and transmission subsystem 16 being used in an unauthorized manner.

Thereafter, the communications subsystem initiates a call to the data evaluation subsystem 18. Once the call is connected, the product data and subsystem data are transferred to the data evaluation subsystem 18. After the data evaluation subsystem 18 confirms that the data has been accurately received, the data evaluation subsystem 18 may send instructions to the data collection and transmission subsystem 16 to delete the product data and the subsystem data from memory. This memory is thereby made available for future data collection and transfer cycles.

The data evaluation subsystem 18 can also transmit other information to the data collection and transmission subsystem 16, examples of which include the current time, programming commands to change the configuration of the data collection and transmission subsystem 16 and download additional software for the data collection and transmission subsystem 16. The data collection and transmission subsystem 16 may also transmit confirmation to the data evaluation subsystem 18 to confirm that the commands received from the data evaluation have been successfully executed.

If the data collection and transmission subsystem 16 has reached the end of its life cycle or if it is determined that the data collection and transmission subsystem 16 is being used in an unauthorized manner, the data evaluation subsystem 18 may send a kill code to the data collection and transmission subsystem 16. The kill code may disable the data collection and transmission subsystem 16 to prevent future use of the data collection and transmission subsystem 16 or component parts thereof. The kill code could also instruct the microprocessor subsystem 24 to erase the memory. Additionally, the kill code could deactivate the communications subsystem SIM card.

The data collection and transmission subsystem 16 may be preattached to the retail display with the antenna(s) placed near the products on the retail display to obtain data relating to the products on the display. The data collection and transmission subsystem 16 will begin operation and communication with the data evaluation subsystem 18 upon being turned on by the person setting up the display.

To enhance the accuracy of the inventory monitoring system, the retail display on which the data collection and transmission subsystem 16 is used may be fabricated from a material that minimizes interference in the communication between the RFID product tags and the RFID antenna. For example, the retail displays may be configured to minimize the metal content or configured so that the metal is oriented in a location that is not between the RFID product tags and the RFID antenna.

The retail displays may be configured in at least two groups with one of the groups intended for shorter term use and another group intended for longer term use. The group of retail displays intended for the shorter term use may include data collection and transmission subsystems 16 that have fewer components and are less expensive to manufacture. For example, such units may have a slave configuration with a ZIGBEE or similar communication subsystem instead of a cellular communication network. Alternatively or additionally, less expensive or shorter life battery may be used with such short term use units.

Figure 3:
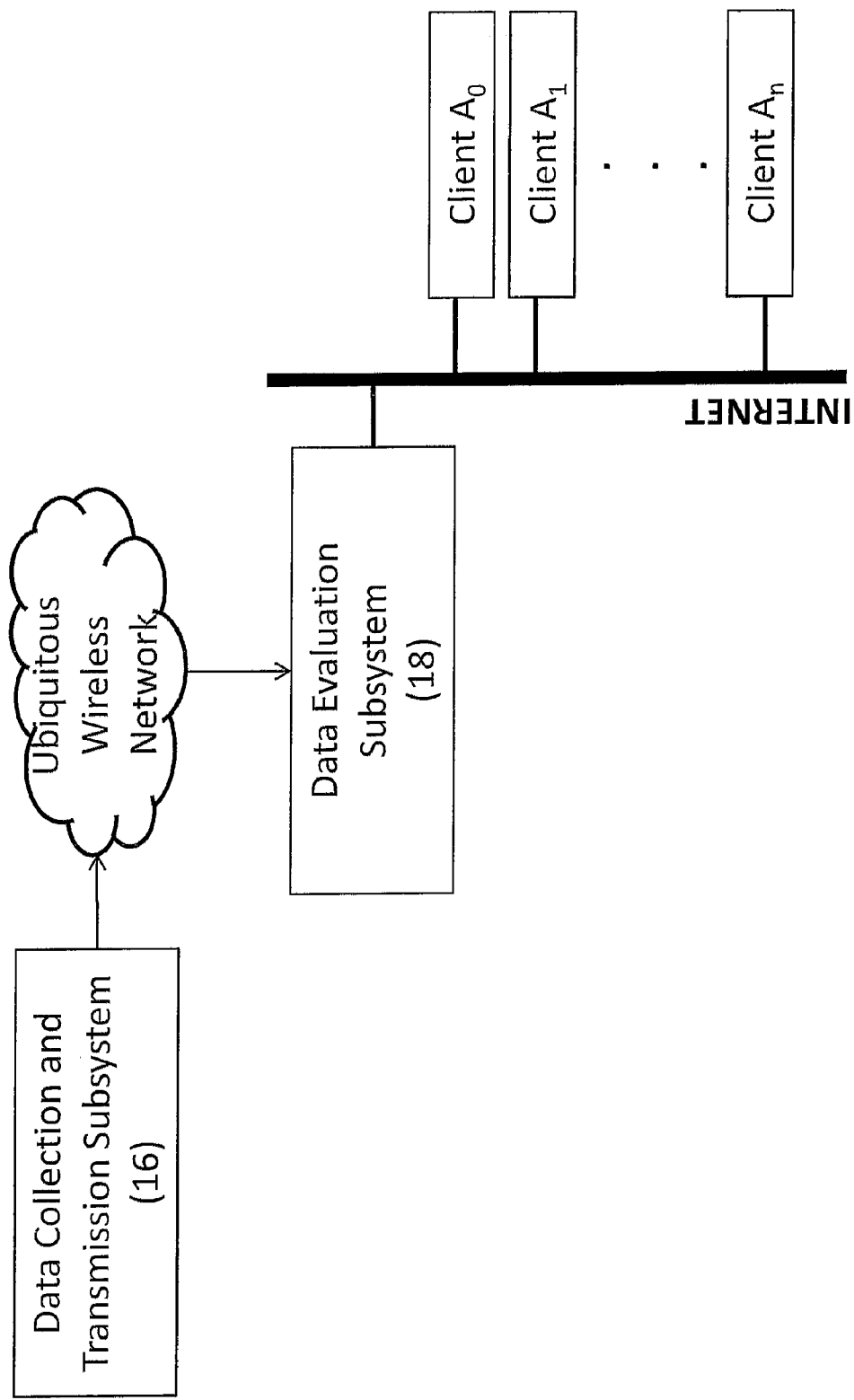
FIG. 3 is a schematic illustration of an embodiment of the inventory monitoring system.

The data evaluation subsystem 18 receives data from the data collection and transmission subsystem 16, as illustrated in FIG. 3. The data evaluation subsystem 18 may contain a database of multiple data collection and transmission subsystems 16 that includes not only inventory reports but also information about the status of each data collection and transmission subsystem 16.

In certain embodiments, the data evaluation subsystem 18 includes basic functionality to merely report the data that is received from data collection and transmission subsystems 16 that are operably attached thereto. The data evaluation subsystem 18 may also include the ability to review individual packages of data that are received from the data collection and transmission subsystems 18 and remove duplicate data points.

The data evaluation subsystem 18 may be associated with a display that is accessible by a user through an internet web site that allows a person to view the data. It is also possible to configure the data evaluation subsystem 18 so that data may be accessed through other mechanisms, examples of which include a wired or wireless computer network. The data evaluation subsystem 18 may provide options to configure the manner in which data is provided for display and/or download.

Figure 5:
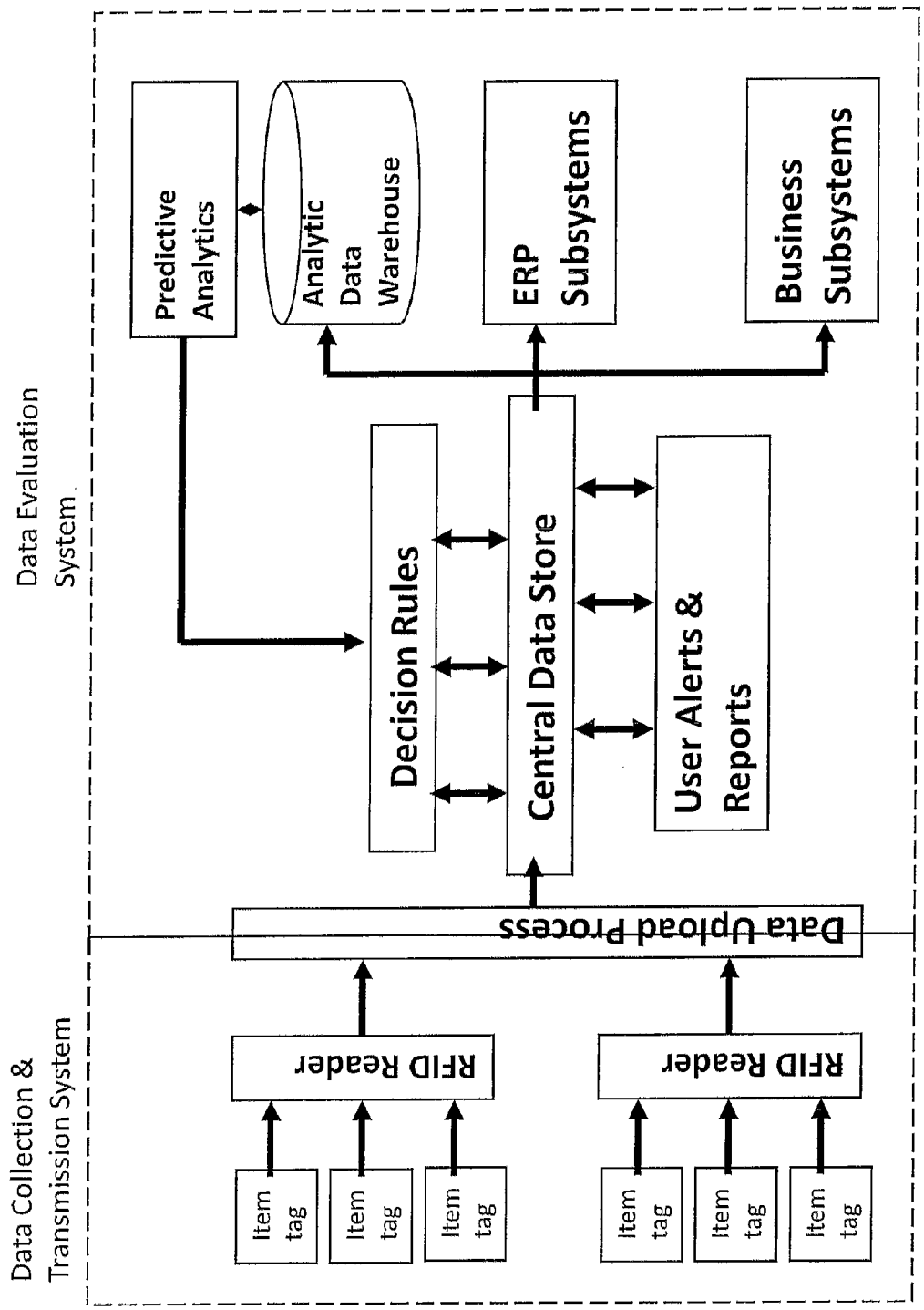
FIG. 5 is a schematic illustration of a data flow in the inventory monitoring system.

In a basic configuration, the data evaluation subsystem 18 may indicate when products are added to or removed from the collection of products being monitored. The data evaluation subsystem 18 may also include analytical capabilities that enable the inventory monitoring system to predict when restocking will be necessary based upon a variety of factors such as day, time, weather, etc. It is also possible for the data evaluation subsystem 18 to predict when restocking is needed based upon particular events. An example of a data flow chart is set forth in FIG. 5

The inventory monitoring system 10 has a variety of applications. In its most basic configuration, the inventory monitoring system 10 can issue alerts when products are placed on display shelves and when it is necessary to restock the products and thereby prepare reports on the inventory turnover rates. The inventory monitoring system 10 can also be utilized to monitor product expiration dates to encourage retailers to display products so that the products expiring first are displayed more prominently and therefore sold first.

In addition to or as an alternative to displaying such notices in a report, the inventory monitoring system may generate notices that are sent out to persons or groups associated with the manufacture, distribution and/or sale of the products. Such notices may be disseminated using a variety of mechanisms, examples of which include a display on a web site, email and text message. The notifications may escalate in frequency depending on the number of products remaining in inventory and/or the estimated duration for the inventory to be depleted.

In more advanced configurations, the inventory monitoring system 10 can prepare demand forecasts using predictive analytic tools and algorithms. The inventory monitoring system 10 can also assist with price optimization analysis and mark down optimization analysis.

To further increase the utility to person or groups associated with the manufacture, distribution and/or sale of the products, the inventory monitoring system 10 may interact with other computer systems such as those which track product delivery and/or point of sale systems.

The inventory monitoring system is particularly suited for high value or perishable products illustrative examples of which include high value electronics, DVDs, CDs, computer software, clothing, fruit, produce, seasonal products, tools, diapers and baby formula.

In addition to monitoring the presence of products on retail shelves, the data collection and transmission subsystem 16 can be used to monitor the environment in which the products are stored. For example, the data collection and transmission subsystem 16 can be programmed to send out an alert if the storage temperature exceeds or goes below a specified value and/or if the humidity goes above or below specified levels.

The relatively low cost of the data collection and transmission subsystem 16 enables it to be disposed of after the use of the retail display is concluded. The relatively low cost of the data collection and monitoring subsystem 16 also enables the inventory monitoring system 10 to be offered as a service such that minimal if any capital investment is required to begin utilizing the inventory monitoring system 10.

As an alternative to disposing of the data collection and transmission subsystem 16, it is possible to package the data collection and transmission subsystem 16 in a manner that facilitates shipping the data collection and transmission subsystem 16. Such features may include a mailing label that is attached to the data collection and transmission subsystem 16 or a shipping package that is associated with the data collection and transmission subsystem 16 while being used.

To encourage the data collection and transmission subsystem 16 to be returned, an incentive may be provided. Examples of such incentives include discounts on future inventory monitoring services, discounts or gifts or other products and services, or cash payments.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An inventory monitoring system for monitoring the presence of a product having a product identification tag associated therewith, wherein the product identification tag contains product identification information, wherein the inventory monitoring system comprises:
   a first data acquisition and transmission device arranged and configured to be coupled to a product storage structure for storing products thereon, the first data acquisition and transmission device comprising:
      a battery power source operable to power the first data acquisition and transmission device;
      a control subsystem;
      a real time clock;
      a wireless tag reader subsystem operably communicating with the control subsystem;
      a first antenna switching subsystem electrically connected by at least one electrical conductor to the wireless tag reader subsystem, the first antenna switching subsystem having a connector interface;
      a plurality of antennas electrically and removably connected by at least one electrical conductor to the first antenna switching subsystem at the connector interface, the plurality of antennas arranged and configured to receive the product identification information encoded in a radio frequency signal from the product identification tag when the product identification tag is within a transmission range of the antennas; and
      a wireless communications subsystem operably communicating with the control subsystem, wherein the wireless communications subsystem transmits the product identification information via a wireless communication network;
   a data evaluation subsystem arranged and configured to:
      receive the product identification information from the wireless communications subsystem of the first data acquisition and transmission device;

monitor inventory of the products at the product storage structure;

issue automatic alerts based on the product identification information; and transmit commands to the wireless communications subsystem of the first data acquisition and transmission device that change a configuration of the first data acquisition and transmission device, wherein at least some of the commands cause the first data acquisition and transmission device to:

download additional software to the first data acquisition and transmission device; and set a periodicity of data transmissions from the first data acquisition and transmission system to the data evaluation subsystem.

2. The inventory monitoring system of claim 1, wherein at least one of the control subsystem, the wireless tag reader subsystem, the wireless communications subsystem and the plurality of antennas are removably mounted in the inventory monitoring system.

3. The inventory monitoring system of claim 1, and further comprising a location monitoring subsystem operably connected to the control subsystem, wherein the location monitoring subsystem is capable of tracking a location of the first data acquisition and transmission device.

4. The inventory monitoring system of claim 1, wherein the battery power source is operably attached to at least one of the control subsystem, the wireless tag reader subsystem and the wireless communications subsystem.

5. The inventory monitoring system of claim 1, wherein the battery power source is removably attached to the first data acquisition and transmission device.

6. The inventory monitoring system of claim 1, and further comprising a second data acquisition and transmission device comprising:

a second control subsystem;

a second wireless tag reader subsystem operably communicating with the second control subsystem;

a second antenna switching subsystem operably connecting the second wireless tag reader subsystem to at least one second antenna that are capable of receiving the product identification information from the product identification tag; and a communications subsystem operably communicating with the second control subsystem, wherein the communications subsystem is arranged and configured to transmit the product identification information to the first data acquisition and transmission device.

7. A process for collecting and managing information about products, wherein the process comprises:

connecting a first data acquisition and transmission device to a product storage structure configured to support the products thereon, each product being associated with a product identification tag that contains product identification information, the first data acquisition and transmission device comprising:

a battery power source;

a first control subsystem;

a real time clock;

a first wireless tag reader subsystem in data communication with the first control subsystem;

a first antenna switching subsystem electrically connected by at least one electrical conductor to the wireless tag reader subsystem, the first antenna switching subsystem having a connector interface;

a plurality of antennas electrically and removably connected by at least one electrical conductor to the first antenna switching subsystem at the connector interface, the plurality of antennas including a first antenna arranged and configured to receive the product identification information encoded in a radio frequency signal from the product identification tag; and a wireless communication subsystem operably communicating with the first control subsystem, wherein the wireless communications subsystem transmits the product identification information via a wireless communication network;

receiving the product identification information from the product identification tag with the first wireless tag reader subsystem and the first antenna; and transmitting the product identification information with the wireless communication subsystem from the first data acquisition and transmission device connected to the product storage structure to a data evaluation subsystem via the wireless communication network;

transmitting commands from the data evaluation subsystem to the wireless communication subsystem that change a configuration of the first data acquisition and transmission device, wherein at least some of the commands cause the first data collection and transmission device to:

download additional software to the first data acquisition and transmission device; and set a periodicity of data transmissions from the data collection and transmission device; and issuing automatic alerts from the data evaluation subsystem based on the product identification information.

8. The process of claim 7, and further comprising placing at least one of the first control subsystem, the first wireless tag reader subsystem and the wireless communication subsystem in a reduced power operating mode when the first control subsystem is not receiving the product identification information and transmitting the product identification information.

9. The process of claim 7, wherein the wireless communication subsystem is configured to only permit connections initiated by the first control subsystem.

10. The process of claim 7, wherein issuing automatic alerts from the data evaluation subsystem comprises automatically indicating that product inventory has changed.

11. The process of claim 7, and further comprising powering the first data acquisition and transmission device with the battery power source.

12. The process of claim 7, and further comprising tracking a location of the first data acquisition and transmission device with a location monitoring subsystem that is operably connected to the first control subsystem.

13. The process of claim 7, and further comprising attaching an identification tag to the first antenna.

14. The process of claim 7, and further comprising attaching an identification tag to the product storage structure on which or in which the product is placed.

15. The process of claim 7, and further comprising transmitting additional information from the first data acquisition and transmission device, the additional information selected from the group consisting of power status, signal strength of the wireless communication network, ambient temperature, ambient humidity, location of the first data acquisition and transmission device, transmission integrity information and combinations thereof.

16. The process of claim 7, and further comprising:

providing a second data acquisition and transmission device comprising a second control subsystem, a second wireless tag reader subsystem and a communication subsystem;

receiving the product identification information from the product identification tag with a second antenna that is associated with the second wireless tag reader subsystem; and transmitting the product identification information with the communication subsystem to the first data acquisition and transmission device.

17. The process of claim 7, and further comprising generating at least one of predictions and inventory optimization notifications for product replenishment based on a plurality of factors using an analytic data evaluation warehouse of the data evaluation subsystem.

18. An inventory monitoring system comprising:
   a retail display configured to support products thereon, each of the products being associated with one of a plurality of product identification tags connected to the product or the product's packaging, the product identification tags storing product identification information;
   a data collection and transmission device coupled to the retail display, wherein the data collection and transmission device is free of physical attachment to a wired data communication network, the data collection and transmission device comprising:
      a battery power source operable to power the data collection and transmission device;
      a control device;
      a real time clock that permits events to be time stamped;
      a product identification tag reader device electrically coupled to the control device;
      an antenna multiplexer electrically coupled by at least one electrical conductor to the product identification tag reader device, the antenna multiplexer having a connector interface;
      a plurality of antennas electrically and removably coupled by at least one electrical conductor to the antenna multiplexer at the connector interface and arranged and configured to wirelessly communicate with the product identification tags;
      a housing coupled to the retail display and at least partially enclosing the control device, the product identification tag reader device, and the antenna multiplexer therein; and
      a cellular communication device electrically coupled to the control device;
   wherein the data collection and transmission device operates to:
      periodically receive product identification information from product identification tags of the products located at the retail display;
      time stamp the received product identification information; and
      communicate the product identification information using the cellular communication device; and
   a data evaluation device arranged and configured to:
      receive the product identification information from the cellular communication device of the data collection and transmission device;
      monitor inventory of the products at the retail display;
      issue automatic alerts based on the product identification information; and
      transmit commands to the cellular communication device of the data collection and transmission device that change a configuration of the data collection and transmission device, wherein at least some of the commands cause the data collection and transmission device to:
         download additional software to the data collection and transmission device;
         disable the data collection and transmission device; and
         set a periodicity of data transmissions from the data collection and transmission device to the data evaluation device.

19. A method of monitoring inventory at a product storage structure, the method comprising:
   connecting a data collection and transmission device to the product storage structure configured to store products, the data collection and transmission device including:
      a battery power source operable to power the data collection and transmission device;
      a control device;
      a real time clock;
      a product identification tag reader device electrically coupled to the control device;
      an antenna switching device electrically coupled by at least one electrical conductor to the product identification tag reader device, the antenna switching device having a connector interface;
      a plurality of antennas electrically and removably coupled by at least one electrical conductor to the antenna switching device at the connector interface and arranged and configured to wirelessly communicate with product identification tags; and
      a wireless communication device electrically coupled to the control device;
   using the data collection and transmission device, wirelessly communicating with product identification tags connected to the products or packaging of the products to periodically receive product identification information;
   periodically sending the product identification information to a data evaluation device using a wireless communication network after receiving the product identification information;
   comparing at the data evaluation device the product identification information with previously received product identification information to identify changes in inventory of the products on the product storage structure;
   sending an automatic alert based on the product identification information when changes in inventory are identified;
   generating at least one of predictions and inventory optimization notifications for replenishment of the products based on a plurality of factors using an analytic data evaluation warehouse of the data evaluation device; and
   transmitting commands to the wireless communication device of the data collection and transmission device that change a configuration of the data collection and transmission device, wherein at least some of the commands cause the data collection and transmission device to: download additional software for the data collection and transmission device, and set a periodicity of data transmissions from the data collection and transmission device to the data evaluation device.

20. The inventory monitoring system of claim 18, wherein the cellular communication device is a transmit only device.

21. The method of claim 19, further comprising operating the data collection and transmission device in a low power sleep mode between the communication with the product identification tags and the periodic sending of the product identification information to the data evaluation device.

* * * * *